March 26, 1929.  C. H. HAPGOOD  1,706,976
WEIGHING SCALE
Filed March 22, 1922  2 Sheets-Sheet 1
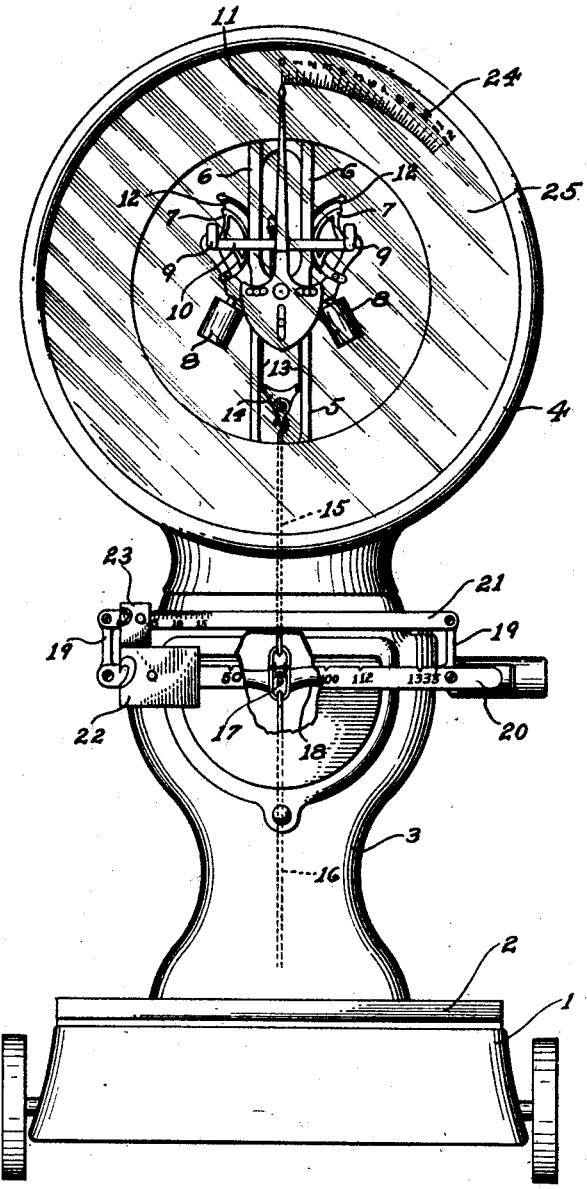
Fig. I.
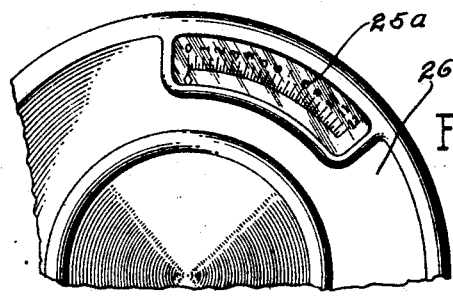
Fig. III.
Inventor
CLARENCE H. HAPGOOD.
By CO Marshall
Attorney March 26, 1929. C. H. HAPGOOD 1,706,976
WEIGHING SCALE
Filed March 22, 1922 2 Sheets-Sheet 2
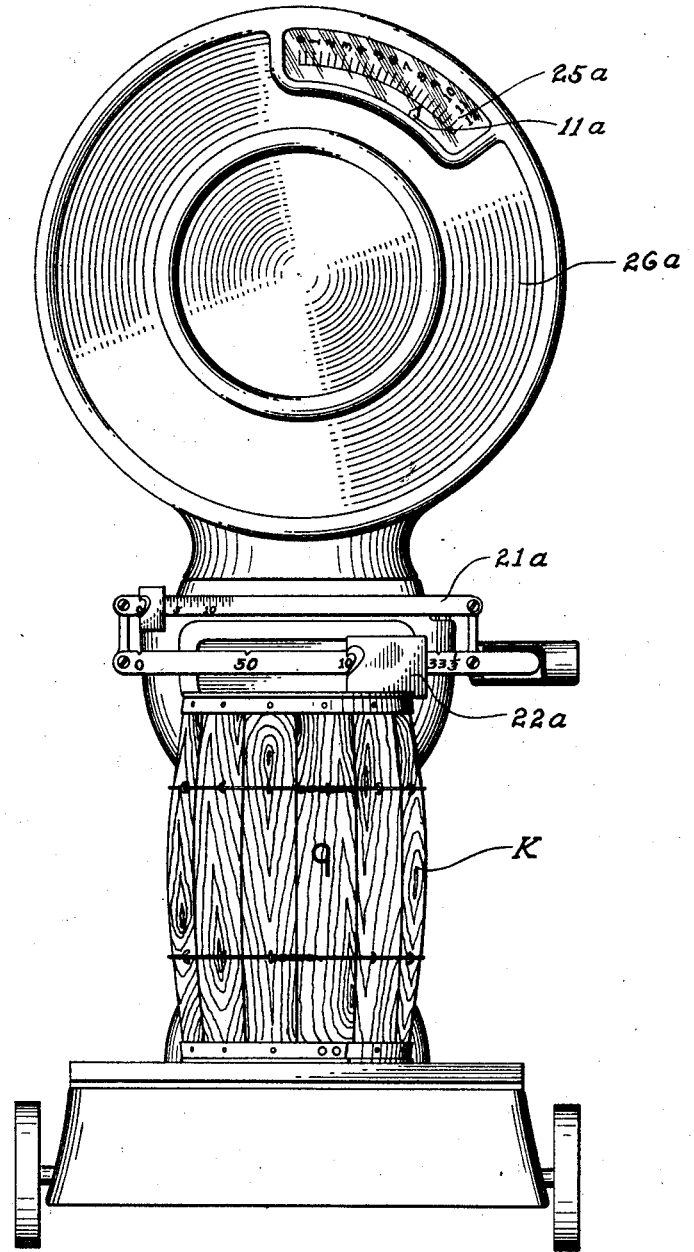
Fig. II.
Inventor
CLARENCE H. HAPGOOD.
By E. V. Marshall
Attorney Patented Mar. 26, 1929.

1,706,976

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed March 22, 1922. Serial No. 545,644.

This invention relates to weighing scales and weighing methods, and particularly to methods for filling to a predetermined weight packages of varying tare weights.

One of the principal objects of the invention is to provide means whereby containers of varying tare weight may be filled with a commodity to a predetermined weight, the contents being weighed in the container.

Another object is to provide a scale in which containers of varying weight and their contents may be weighed without shifting the poises or otherwise adjusting counterbalancing mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is an elevational view of a weighing scale embodying my invention, part of the casing of the scale being broken away;

Figure 2 is an elevational view of another form of the scale embodying my invention; and Figure 3 is a fragmentary view of the indicating mechanism of the scale shown in Figure 2 with the indicator in another position.

Referring to the drawings in detail, the base 1 of the scale is hollow and contains the platform lever mechanism (not shown) which supports the platform or commodity-receiver 2. Fixed upon the rear end of the base 1 is an upright housing or hollow column 3 which supports at its upper end a substantially watch-case-shaped housing 4 that contains the automatic load-offsetting mechanism.

Within the housing 4 is a frame 5, upon the upright portions 6 of which are supported fulcrum sectors 7, the fulcrum sectors being supported by means of flexible metallic bands or ribbons which overlie the outer parallel vertical faces of the uprights 6. The automatic counterbalancing mechanism of the scale consists of a pair of oppositely swinging pendulums 8 which are rigidly connected to their respective fulcrum sectors 7. Pivotally connected to the fulcrum sectors 7 on an axis passing through the center about which the arcuate faces of the sectors are curved is a compensating frame 10 which moves vertically as the pendulums 8 swing outwardly, the frame 10 being suitably connected through rack and pinion mechanism (not shown) to an indicator hand 11.

Rigidly connected to the respective pendulums 8 and fulcrum sectors 7 are power sectors 12 from which depend a pair of metallic ribbons 13, the lower ends of the ribbons being connected to an equalizer 14, the equalizer 14 being in turn connected through links 15 and 16 to the platform lever mechanism which is contained within the base 1. The link 16 is also connected by means of a pivot 17 to a lever 18 fulcrumed in the upper end of the column 3, and supported upon the lever 18 by means of brackets 19 are weighing beams 20 and 21, the beam 20 carrying a comparatively heavy sliding poise 22, while the beam 21 carries a lighter sliding poise 23.

A graduated chart 24 is located within the housing 4 and is visible through a glass window or crystal 25. In the form of device shown in Figure 1 the window extends over substantially the entire face of the housing 4, while in the form shown in Figures 2 and 3 the greater part of the face is covered by a plate 26$^a$ which contains an arcuate window 25$^a$ through which the graduated portion only of the chart 24 is visible.

In the form of the device shown in Figure 1 the automatic load-offsetting mechanism is visible to the operator. Owing to the much greater area of exposed glass in this form of scale the window 25 is, however, much more likely to become broken than is the window 25$^a$ in the form shown in Figures 2 and 3. The mechanism in both forms of scale is the same. In weighing packages of commodities the usual procedure is first to place the empty container on a scale and to counterbalance its weight by means of a sliding poise. A sufficient amount of the commodity to be packaged is then placed in the container to bring an indicator to a definite graduation or, if the scale being used is an automatic scale, to balance a counterpoise on another beam. In order to save time the containers are often weighed on a separate scale and the weights stenciled or otherwise marked upon them. Approximately the required amount of the commodity may then be placed in each package before it is weighed, as the scale operator can set his tare poise to the graduation on the beam corresponding to the weight marked on the container.

In using applicant's device, however, no manipulation whatever of the weights is necessary. Containers having the tare weight marked upon them may be filled with approximately the required amount of the commodity before they are brought to the scale, or they may be filled while upon the scale. Figure 2 shows a nail keg K on the platform of the scale, the tare weight of the keg (9 lbs.) being marked upon it. The net weight of the contents of the keg is 100 lbs. This net weight does not vary, but each keg contains the same number of pounds of nails. The tare weight of the kegs does, however, vary as much as three or four pounds. In weighing nails with the aid of applicant's invention the poise $22^a$ is set at 100 lbs. and its position on the beam is left unchanged. As each keg is placed upon the scale the operator notes the tare weight marked upon the keg and fills the keg to a weight which brings the indicator $11^a$ to the corresponding graduation on the chart $25^a$. Since there is no manual manipulation of poises the operation of securing proper and uniform net weights is greatly facilitated.

Owing to the fact that the tare weight of the containers is usually much less than the weight of the contents, the automatic counterbalancing mechanism may be made very sensitive and the graduations on the chart spaced widely apart. By the aid of applicant's invention the net weights may, therefore, be obtained with a greater degree of accuracy than is possible without the expenditure of much more time.

The beam $21^a$ may be used in the comparatively rare instances when the weight of the container exceeds the capacity of the chart.

I have shown the beam 20 as provided with notches and markings corresponding to required net weights. This beam may, however, be plain and the poise may be set by the use of a test weight. If, for example, the required net weight of the commodity is 100 lbs., a 100 lb. weight may be placed upon the platform and the poise 22 moved to a position on the beam in which the indicator 11 will stand at zero.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a device of the class described, in combination, a commodity-receiver, beam weighing mechanism of comparatively great capacity connected thereto and adapted to counterbalance net weights of packaged commodities, and automatic weighing and indicating mechanism of comparatively great sensitiveness connected to said commodity-receiver and adapted to counterbalance and indicate varying tare weights of containers for such commodities.

2. In a device of the class described, in combination, a commodity-receiver, beam weighing mechanism of comparatively great capacity connected thereto and having markings corresponding to required net weights of packaged commodities, and automatic weighing and indicating mechanism of comparatively great sensitiveness connected to said commodity-receiver and having markings corresponding to various tare weights of containers for such commodities.

CLARENCE H. HAPGOOD.